F. D. Ballou.

Sewing Machine.

Reissued Mar. 31, 1868.

No. 2906

Witnesses
F. W. Coombs
R. S. Spencer

Inventor:
F. D. Ballou
per Munn & Co
attorneys

UNITED STATES PATENT OFFICE

W. N. ELY, OF STRATFORD, CONNECTICUT, ASSIGNEE, BY MESNE ASSIGNMENTS, OF FRANCIS D. BALLOU.

IMPROVEMENT IN MECHANISM FOR BOOT AND SHOE SEWING MACHINES

Specification forming part of Letters Patent No. 34,203, dated January 22, 1861; reissue No. 2,906, dated March 31, 1868.

*To all whom it may concern:*

Be it known that I, FRANCIS D. BALLOU, of Abington, in the county of Plymouth and State of Massachusetts, have invented certain new and useful Improvements in Sewing-Machines for Sewing on Boots and Shoes; and I do hereby declare that the following is a full, clear, and exact description of the same, reference being had to the accompanying drawings forming a part of this specification, in which—

Figure 5:
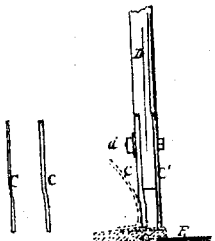
Figure 1:
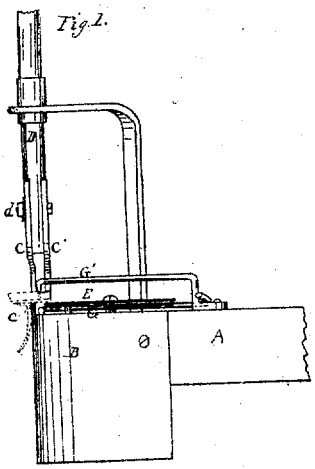
Figure 2:
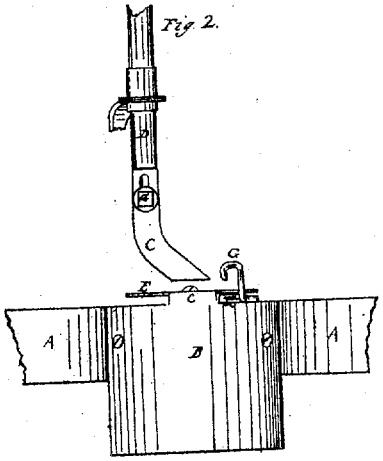
Figure 4:
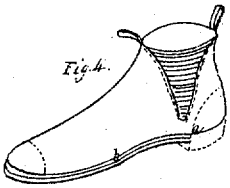
Figure 3:
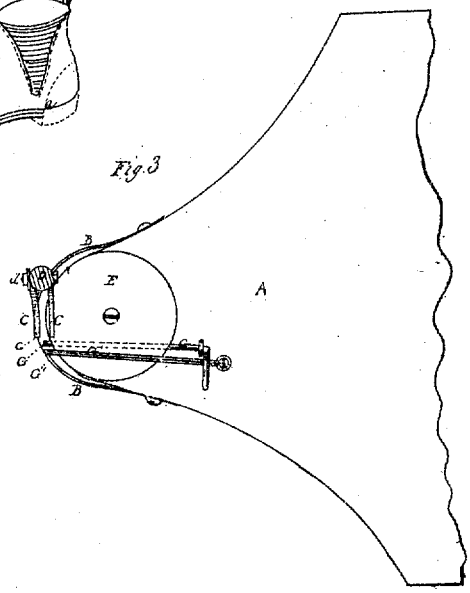

Figure 1 represents a side elevation of that portion of the sewing-machine constituting my invention, showing in red lines a portion of the upper, outer sole, and welt in the position to be operated upon by the awl and needle, when the shoe is inverted or the sole is uppermost in the machine. Fig. 2 is a front view of Fig. 1. Fig. 3 is a top view of Figs. 1 and 2, with the parts in the same relative position with each other as in the preceding figures. Fig. 4 represents an ordinary boot or shoe. Fig. 5 is a view of the pressure-bar of Figs. 1, 2, and 3, opener, and revolving disk, showing their relative position when the sole of the shoe is down or in an opposite position to that in Fig. 1.

Similar letters of reference indicate corresponding parts in the several figures above referred to.

The drawings do not represent the needle nor the awl, nor any of the devices for forming the stitch, as the several parts to be claimed may be used with any suitable sewing mechanism for carrying wax-thread.

This invention does not refer to the devices for forming any particular stitch, but to devices for presenting the work to the awl and needle in a proper manner for stitching the welt to the outer sole.

This invention is also closely connected with my patent of January 10, 1860, for making sewed boots and shoes.

Where the welt is stitched to the upper previously to putting on the outer sole, then the outer sole is stitched to the welt from the outside of the shoe or boot by my present improvements, and it is for the purpose of perfecting the operation of making stitched boots and shoes by my machinery.

The object of my improvements in making stitched boots or shoes by sewing mechanism is to hold the work down on the table or bed-plate of the machine as near the awl and needle as possible, and to keep the channel formed on the outside of the outer sole open, so that the seam will follow closely in this channel; that the raised lip of the channel may be pressed down after the shoe is finished, and present a neat appearance, as if the stitching had been done by hand. It further provides for stitching the shanks of the boot or shoe, in which operation the work can be presented to the awl and needle with great facility; and it provides for keeping the upper back from the needles, and for guiding the channel to receive the same through the machine, and for sewing light and heavy, large or small work, all as will be hereinafter described and represented.

To enable others skilled in the art to fully understand my invention, I will proceed to describe its construction and operation.

In the drawings, A represents the bed-plate or table of the machine, the front end of which is curved out, as represented by the drawings, Fig. 3, for the purpose of bringing the work up close under the needle and awl, (which latter parts are not shown,) for stitching the shanks of the boot or shoe from the points *a* to *b* of Fig. 4. On the rounded end of table A is secured a curved plate, B, with a lip or standard, *c*, projecting up from it a suitable distance, against which standard or lip is placed the edge of the upper during the operation of sewing, in Fig. 1. This lip serves to press back the upper to prevent the awl or needle from coming in contact with it, and operates as a support to the work. Its height may be regulated according to the work to be done. The work often requires to rest upon a comparatively small surface as the stitching progresses. The curved plate or guard B is bent out from the edge of the table, forming a throat for the purpose of allowing the awl and needle to pass freely down between this plate and table. By changing the plate B and using others of different thickness, they may be used as gages for determining the space required between the upper leather and the row of stitching that is made through the welt and outer sole, when the work is presented to the machine with the sole uppermost. Above this curved plate B, and held in suitable guides, is a vertical rod, D, which may be acted upon by a spring, if necessary, carrying on its lower end two adjustable foot-pieces, C C′, the inner one, C′, being straight and parallel with the rod D, and the other one, C, is slightly bent inward or toward that lettered C′. These shoes are both bent forward, as clearly shown in Fig. 2, and have their lower edges parallel with the surface of table A. The shoe C is placed directly over the standard *c* of plate B, while the shoe C′ is directly over the outer edge of a revolving disk, E, as shown by Fig. 1. These two shoes C C′ are intended to hold the work down firmly upon the movable disk E and standard *c* of plate B, so that in the upward motion of the awl and needle they will not carry the work with them. They rest on each side of the seam, and press upon the welt and edge of the outer sole that projects out from the upper of the shoe. The outer shoe-plate C serves a twofold purpose, and, besides holding the work down, it is intended to gage the work, so that the awl and needle will follow in the channel previously cut near the edge of the outer sole. It thus serves to determine the space required between the upper leather and the row of stitching made through the welt and outer sole, when the shoe is presented to the machine with the sole down. These foot-pieces are made adjustable for the purpose of adapting the ends that rest on the work to the difference caused by the size of the welt, there being much difference in the size of the welt used, and by loosening the screw *d* the pieces may be adjusted to suit any kind of work.

For different-sized shoes or boots, and when the stitching varies in its distance from the edge of the sole, or from the upper, a shoe-plate, C, of a different width must be used. The curve shown by Fig. 1 is given to this plate C, so that its lower edge may be brought as close to the upper as possible, so that the seam may have a strong hold on the welt and outer sole. In front of the shoe-plates C C′, and projecting up a suitable distance above the disk E, upon which the outer sole rests, is a pointed bar, G. In Figs. 1, 2, and 3 this point is shown turned down, but in Fig. 5 it is shown in operation, the point of which serves to open the channel that is previously cut around the outside, and near the edge of the outer sole. This point is kept in such a channel, and as the work is fed up to the awl and needle the channel is opened and kept open by the said point, so that both the awl and needle will pierce the leather through this channel, and the stitches will be sunk or drawn tightly into the channel, so that when the shoe is finally stitched the lip or raised portion of the leather of the channel can be fitted down in a neat and perfect manner, as in the case of hand-stitched work. It will be seen that the opener G will further serve to guide the work up to the sewing devices. The opener should immediately precede the awl, so that the awl will descend and pierce the hole through the bottom of the channel, and not to one side and then another. This opener G is used when the welt is uppermost in the machine, and when the foot-plate C is against the upper, to hold it back from the awl and needle; but when the shoe is turned over or inverted, and the sole is uppermost, an opener, G′, similar to G, and serving the same purpose, is used. The opener G is then turned down out of the way, or removed from the machine. The lip or standard *c* of plate B then serves to hold the upper out of the way of the awl and needle, Fig. 1, and the foot bar or rod D holds the work down on the table while the awl and needle perform their work, both of which work between the foot-plates C and C′. The circular plate or revolving disk E serves, in its relation to the above-mentioned parts, to allow the work to pass freely from the awl and needle, for, as the work must be held down hard upon the table on account of its peculiar character, a fixed surface for it to pass over would cause the work to draw and twist, and it would be very difficult to control the correct line for receiving the stitch; but this revolving surface, in connection with the guides and opener and presser-foot or plates, will greatly facilitate the movement of the work up to and from the awl and needle. By using these devices with the ordinary awl-feed wax-thread sewing-machine, in which a "belaying double-loop stitch" is formed, the work must be reversed in some cases, so that the single thread will be in the channel of the outer sole, and the double thread or stitch on the welt. This is done for light work.

The operation of my invention may be briefly described as follows: In the operation, Fig. 5, the upper of the boot or shoe is held (commencing at the point *a*, Fig. 4) against the foot C, the outer sole resting on the lip or post *c*, and the circular disk E with the opener G′ placed in the channel previously cut in the outer sole. The foot-plates are adjusted by screws so as to rest on the welt. The welt and outer sole are then stitched together in the usual manner of sewing with the awl-feed wax-thread sewing-machine. In operation, Figs. 1, 2, and 3, the upper leather of the boot or shoe is held (commencing at the heel at *a*) against the lip or post *c*, with the welt resting on the top of this post or lip and the circular plate E. The ends of the foot-plates C C′ are adjusted as required, resting on the outer sole of the shoe. The opener G is placed in the channel, as described for G, and the welt and outer sole are then stitched together in the usual manner of operating the awl-feed sewing-machines.

Having thus described my invention and improvement in waxed-thread sewing-machines, what is claimed is—

1. The foot-piece C, when constructed and arranged and used as a guard, or guard and gage, substantially as and for the purposes described.

2. The lip or standard *c*, when constructed, arranged, and used as a guard or gage or support for the shoe, substantially as described.

3. The combination of a guide or guard, substantially as described, with an opener for opening the channel for the action of the needle, substantially as set forth.

4. The presser D, in combination with the adjustable foot-pieces C and C′, substantially as described.

5. The bearing-plate B and lip or standard *c*, in combination with the presser-bar, substantially as described.

6. The projecting perpendicular plate B with standard *c*, substantially as and for the purposes described.

7. The combination of the bearing-plate or table E with the lip or standard *c*, substantially as described.

8. The combination of the standard *c* with the foot-piece C, arranged substantially as described, and for the purposes set forth.

9. The supporting, guarding or guiding, and channel-opening mechanism, when combined and arranged, in relation to each other, substantially as and for the purposes set forth.

10. The projecting horizontal table-plate A, provided at its outer edge with a projecting standard, *c*, and arranged so that an opening is formed between the two for the needle, substantially as and for the purposes described.

In witness whereof I have hereto signed the foregoing specification.

F. D. BALLOU.

Witnesses:
GEO. A. BEAL,
JOHN L. NASH.